No. 730,262. PATENTED JUNE 9, 1903.
E. HARTMANN.
ELECTRIC METER.
APPLICATION FILED FEB. 24, 1902.
NO MODEL.
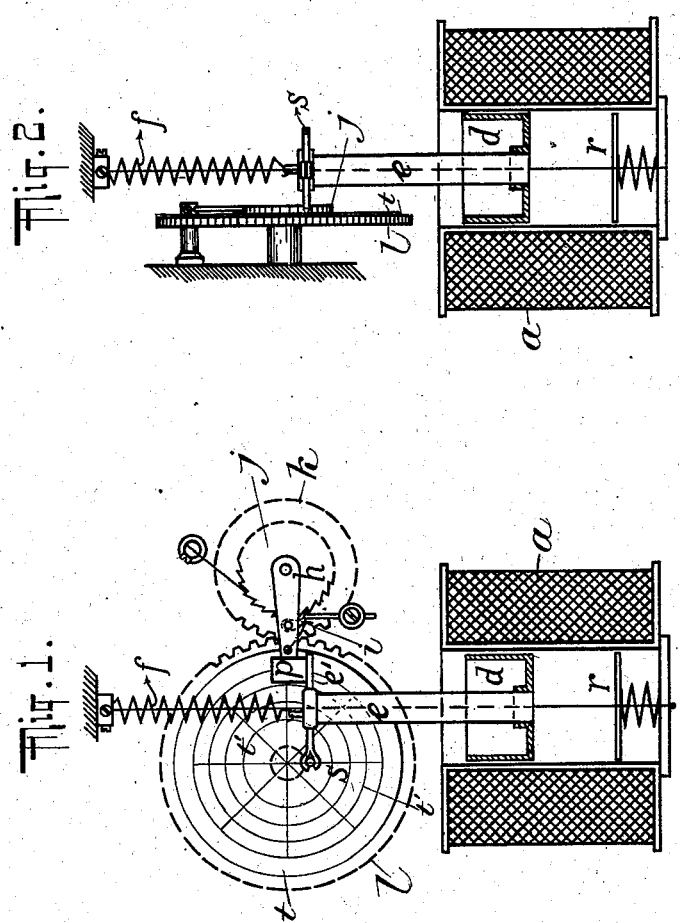
WITNESSES:
INVENTOR
EUGEN HARTMANN
BY
ATTORNEYS No. 730,262. Patented June 9, 1903.

UNITED STATES PATENT OFFICE.

EUGEN HARTMANN, OF FRANKFORT-ON-THE-MAIN, GERMANY.

ELECTRIC METER.

SPECIFICATION forming part of Letters Patent No. 730,262, dated June 9, 1903.

Application filed February 24, 1902. Serial No. 95,148. (No model.)

*To all whom it may concern:*

Be it known that I, EUGEN HARTMANN, professor, electrical engineer, residing at Obere Königstrasse No. 9, Frankfort-on-the-Main, in the German Empire, have invented new and useful Improvements in Electric Meters, of which the following is a specification.

The present invention relates to an improved maximum indicator and recorder which has no axes and obnoxious friction in its measuring device proper and which registers not only the regular consumption of electricity, but also short-circuits.

The apparatus devised with this object in view consists of an electromagnetic ammeter constructed on the principle of the "Kohlrausch" spring-galvanometer, which comprises a vertical hollow spool into which dips an iron core. This iron core is suspended from a coiled spring. As the current is passed through the spool the core is acted upon, so that it seeks to enter the hollow space within the spool. Thereupon the spring is distended and the strength of the current indicated by a pointer attached to the core upon a suitable scale. Upon the lessening of the current the core is retracted by the coiled spring.

In the drawings, Figure 1 illustrates a face view, partly in section, of my improved electric meter; and Fig. 2, a side view, also partly in section, thereof.

The present invention, as shown in two views, partly in section, in the accompanying drawings, comprises a powerful damping mechanism, such as $d$, its iron core $e$, which is placed under the control of the coil $a$, being directly connected to the stylus or marking device $s$, which registers upon a suitable paper or other scale carried by dial $l$. The electromagnetic action exercised by the coil upon the iron-core is, by an adequate increase in the dimensions of the iron parts made so powerful that while registration may be effected by "dipping" the iron core direct the counteracting-spring $f$ after the current has been switched off—*i. e.*, after the return of the index-hand and style mechanism to zero—still retains some of its power sufficient for the performance of a nominal amount of work. Now this surplus power of the spring $f$ is utilized in causing the dial or roller (as the case may be) which receives the readings to revolve to a certain extent, so that when the instrument is next switched in the marking recommences at a different point of the dial or roller from where it had previously been interrupted. One way of securing this result would be, for example, to provide for the raising of a weight $p$ by a finger or lug $e'$ upon each return to zero, such weight being mounted for the purpose upon a single-armed lever $h$, carrying a pawl or spring $i$, which engages with a ratchet-wheel $j$, the arrangement being such that while the weight is being lifted the pawl or spring slips over the teeth of the ratchet-wheel, whereas the moment the weight $p$ is released and allowed to drop such pawl or spring $i$ actuates the wheel $j$, whereof the movement thus imparted is transmitted to the registering roller or dial $l$ through the medium of one or more gear-wheels $k$.

At the bottom of the coil $a$ a spring $r$ is placed which prevents the stylus $s$ of the registering device from passing beyond the scale $t'$ on the paper $t$, carried by dial $l$, even if the instrument is largely overcharged; but if a short circuit occurs the stylus $s$ will pass beyond the outer limit of the scale $t'$, and the line will thus extend beyond the outer portion of the scale, indicating thereby that a short circuit has occurred.

Inasmuch as the instrument is designed for use as a maximum indicator, it will not be affected by the magnetic remanence resulting from the employment of comparatively large iron bodies.

Now what I claim, and desire to secure by Letters Patent, is the following:

1. In a maximum-current indicator, the combination of an electromagnetic ammeter with a damping device, a registering device, and means, controlled by the return movement of the iron core, for transmitting motion from the ammeter to the dial of the registering device.

2. In a maximum-current indicator, the combination of a spring-galvanometer with a damping device, a registering device, and means, controlled by the return movement of the iron core, for transmitting motion from the galvanometer to the dial of the registering device.

3. In a maximum-current indicator and recorder the combination of a spring-galvanometer with a damping device, a registering device and means to transmit motion from the galvanometer to the dial of such registering device at the end of the return movement of the iron core, substantially as described.

4. In a maximum-current indicator and recorder the combination of a spring-galvanometer with a spring at the bottom of the electric coil, a registering device, substantially as described.

5. In a maximum-current indicator and recorder the combination of the ammeter with a registering device, a finger or lug connected with the moving part of the ammeter, a pawl connected with the registering device for moving the dial thereof, said pawl adapted to receive motion by the said finger or lug, substantially as described.

6. In a maximum-current indicator, the combination of a coil, a core under the influence of said coil, a marker held to move with said core, a movable dial coöperating with the marker, a spring for returning the core to its original position, and means, controlled by the return movement of the core under the influence of the spring, for imparting motion to said dial.

In testimony whereof I have signed my name to this specification in the presence of two subscribing witnesses.

EUGEN HARTMANN.

Witnesses:
 FRIEDRICH HESSE,
 HERMANN DIEHL.